United States Patent Office 2,976,805
Patented Mar. 28, 1961

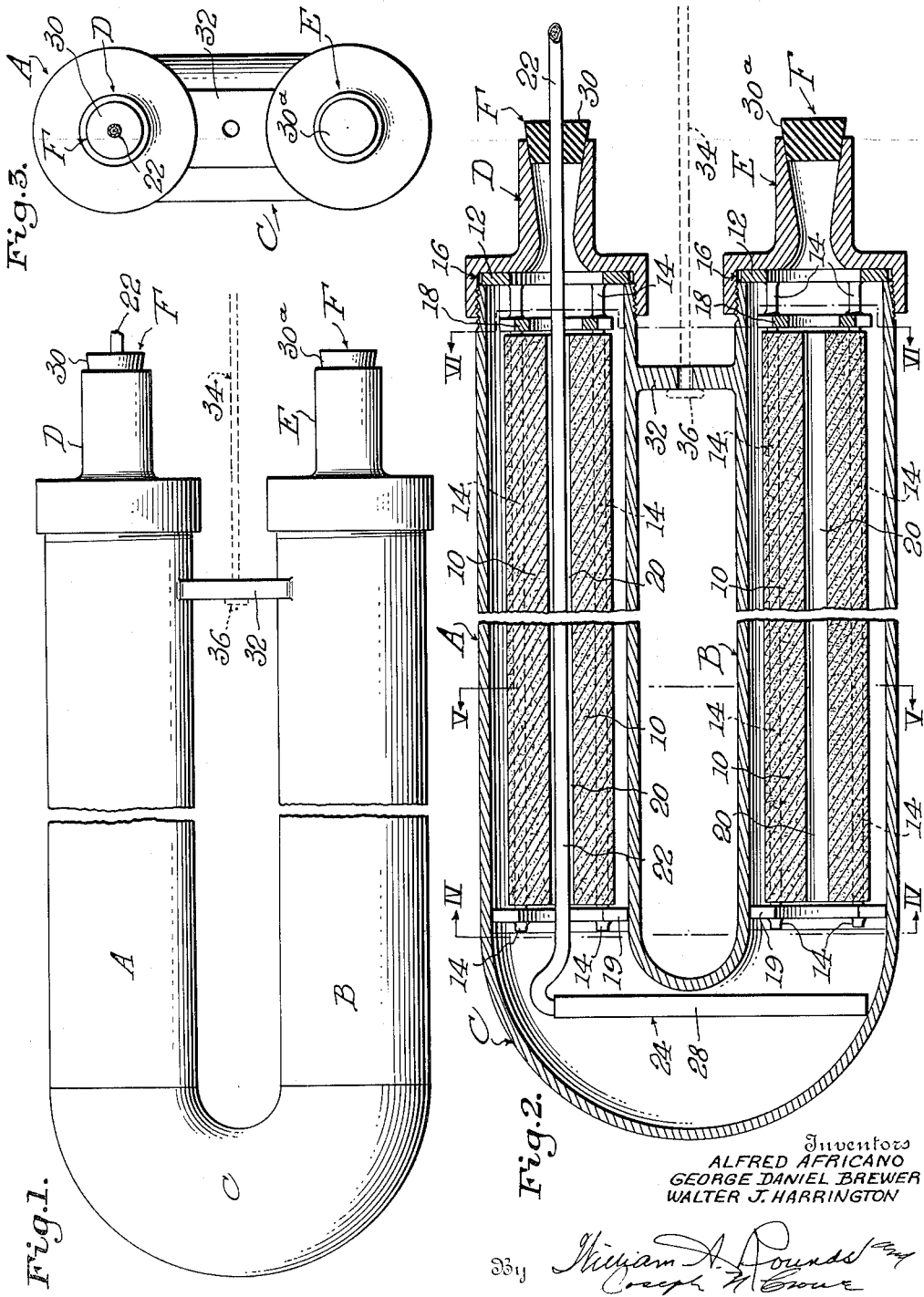

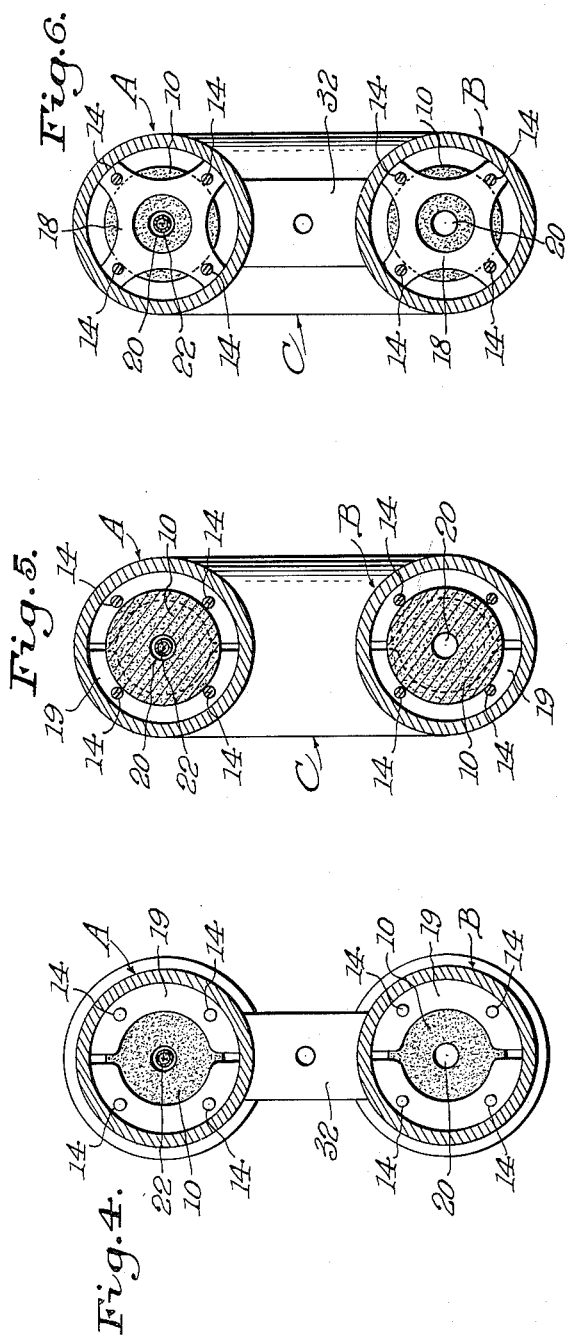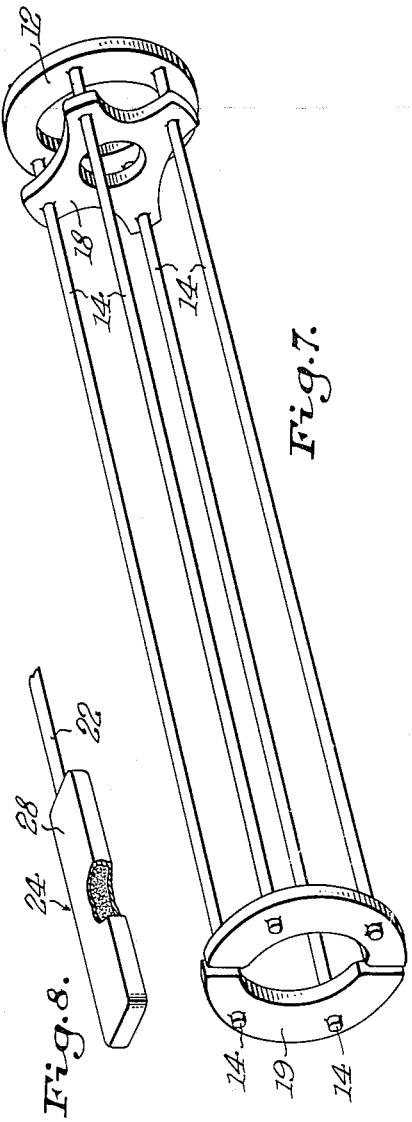

2,976,805

ROCKET CONSTRUCTION

Alfred Africano, Caldwell, N.J., George Daniel Brewer, Redondo Beach, Calif., and Walter J. Harrington, Ithaca, N.Y., assignors to the United States of America as represented by the Secretary of War Filed Feb. 11, 1947, Ser. No. 727,910

6 Claims. (Cl. 102—49)

The present invention relates to an improved construction of rocket, which affords improved means for attaching a cable to be transmitted by the rocket to a desired target or object, whereby the cable will act as a stabilizing means for the rocket and the flame from the rocket nozzle will be removed from the outgoing cable.

The improved rocket is substantially U-shaped, twin rocket tubes being connected at their full diameter by an arcuate U-shaped connecting member, the rocket tubes being substantially parallel. The invention also includes an improved trap or holding means for the propellent powder charge, and improved igniter means therefor.

The invention will be understood by reference to the accompanying drawings, wherein:

Figure 1 represents a plan view of the rocket of the present invention;

Figure 2 is a horizontal sectional plan view of the rocket of Figure 1;

Figure 3 is a rear end elevation of the rocket of Figure 1;

Figure 4 is a vertical sectional elevation through the forward part of the rocket, the view being taken on the line IV—IV of Figure 2, looking in the direction of the arrows;

Figure 5 is a vertical sectional elevation through another part of the body of the rocket, the view being on the line V—V of Figure 2, looking in the direction of the arrows;

Figure 6 is a vertical sectional elevation through the rear part of the rocket, the view being on the line VI—VI of Figure 2, looking in the direction of the arrows;

Figure 7 is a perspective view of a holder or cage for the propellent charge of the rocket; and Figure 8 is a perspective view, partially broken away, of an improved igniter employed for igniting the propellent charge of the rocket.

Referring more particularly to the drawings, reference characters A and B indicate similar, parallel rocket tubes, connected by their full diameters to a U-shaped connecting member C, this U-shaped connecting member forming the front end of the rocket. The rocket tubes A and B are welded or otherwise inseparably secured to the connecting member C. The rear ends of the rocket tubes A and B are threaded so as to receive the nozzles D and E which normally are closed by closures F.

In each rocket tube there is mounted a trap or holding means for the propellent charge 10. This trap comprises a ring 12 which receives resilient wires or rods 14, the ring 12 entering an annular space 16 between the nozzle housings and the end of the rocket tubes and holds the trap fixedly in position in the rocket tubes.

Also mounted on the wires 14 is an abutment member 18 against which abuts the rocket propellent charge 10. The other end of the rod-like members 14 pass through a split ring 19 which forms the other end-retaining abutment for the propellent charges 10. Expansion of the split ring 19 enables the grain composing the propellent charges to be inserted in the trap, the insertion of the propellent being effected rapidly and easily by pulling the split ring 19 apart, thereby spreading the upper portions of the rod-like members 14, the resulting enlargement of the holding trap enabling the grain of the propellent charge to be inserted, rod-like members 14 guiding the grain during the insertion and holding the grain when inserted. The rod-like members 14 have sufficient resiliency to close the split ring 19 responsively to release of the opening force applied thereto, thereby retaining the propellent charge in the holding trap until the trap, with its enclosed charge, is inserted in the rocket tubes.

The closed diameter of the split ring 19 is substantially the same as the inside diameter of the rocket tubes, so that, when the charge-holding traps are inserted in the rocket tubes, the inner wall of the tubes guides the insertion of the trap and locks the split rings in closed position. The diameter of the rings 12 is greater than the internal diameter of the rocket tubes, so that the engagement of the rings 12 with the end of the rocket tubes forms the stop for the holder traps.

For assembling the rocket, a fuse 22 is provided first. This fuse may be composed of a fuse compound, such as black powder encased in a tubular envelope or sheath. The fuse 22 communicates with an igniting element 24, this element 24 being rectangular in shape, and of sufficient length to span, when inserted, the propellent charges 10 for simultaneous and even ignition of the propellent charges. The igniting element 24 is composed of a long-flame combustible, such as black powder in a suitable casing 28. The long flame this igniter is adapted to fire the propellent charges 10 simultaneously and evenly. These charges 10 are of the usual composition employed for this purpose. Nozzles D and E are closed by plugs 30 and 30a, plug 30 being provided with a hole therethrough for insertion of the fuse 22. These plugs are blown out responsively to the ignition of the charges 10 by the expansion of the gases produced by the combustion of the propellent charges.

The igniter 24 on the end of fuse 22 is introduced into one of the rocket tubes, for instance tube A, and is pushed by pushing motions on fuse 22 until it engages the bend in the U-shaped connecting member C. Further advancement of the fuse 22 and igniter 24 causes the latter to be guided by the bend in the connecting member C until it assumes the position shown in Figure 2, where it spans the ends of the propellent charges that now are to be inserted in the rocket tubes.

These propellent charges are molded with an axial hole 20 extending therethrough. One of these charges is passed over the fuse 22 which is received in the opening 20 of the charge until the holding trap for the charge is inserted with the annular ring 12 abutting the end of the rocket tube A. The fuse 22 is then passed through the nozzle to be applied to the rocket tube A, and through the hole in plug 30 for the nozzle. The nozzle D then is screwed up tightly on the rocket tube A and the plug 30 inserted in the nozzle.

The rocket tube B is fitted similarly with a similar nozzle E which is plugged with a solid plug 30a. It will be understood that the propellent charge for this tube B is held in a similar holding trap that is identical with that provided for the rocket tube A.

A further important feature of the present rocket construction is the provision of a web 32 connecting the rocket tubes A and B adjacent to the rear ends thereof but sufficiently forward of the nozzles D and E to prevent a cable or the ilke 34 which is connected to the web 32 from being reached from the flames issuing from the nozzles D during the launching and travel of the rocket. This cable 34 is connected, as indicated at 36, to the midpoint of the web 32. The connection 32 is in alignment both horizontally and vertically with the center of gravity of the rocket, which fact increases the stability of the rocket in flight, the cable being attached midway of the rocket tubes, acting somewhat similarly to the tail of a kite while the rocket is in flight, stabilizing the rocket and tending to hold the rocket on a straight course. The connection of the cable being in alignment with the center of gravity of the rocket prevents any turning moment being imparted to the rocket; and the twin, parallel rocket tubes, with their parallel jets expelled with equal force, obviate any broaching of the rocket from its predetermined course of flight. The cable is connected as far to the rear of the rocket tubes as is practical for maximum stability of the rocket while maintaining the cable away from the flame jets.

While the invention has been illustrated and described specifically in connection with a U-shaped rocket having a pair of tubes, it will be understood that the construction is not limited necessarily to two rocket tubes, but any desired plurality thereof may be employed that is arranged symmetrically around the cable connection, so that the stabilizing effect of the cable may be maintained.

Having thus described our invention, what we claim and wish to secure by Letters Patent is:

1. A rocket construction comprising a pair of substantially parallel tubes, a U-shaped connecting member for the tubes, a propellent charge in each of the tubes, igniting means for the charge disposed in the U-shaped connecting member for the tubes, and means for firing the igniting means.

2. A rocket construction comprising, in combination, substantially parallel rocket tubes, U-shaped connecting means for the rocket tubes, a propellent charge in each of the rocket tubes, igniting means for the propellent charge disposed in the U-shaped connecting means, and a Venturi-discharging nozzle for each of the tubes threadedly mounted thereon.

3. A rocket construction comprising, in combination, substantially parallel rocket tubes, U-shaped connecting means for the rocket tubes, a propellent charge in each of the rocket tubes, igniting means for the propellent charge disposed in the U-shaped connecting means, a Venturi-discharge nozzle for each of the tubes threadedly mounted thereon and defining an annular space between each of the rocket tubes and the nozzle, and holding means for the propellent charge secured in the said annular space between each of the discharge nozzles and the rocket tubes.

4. A rocket construction comprising, in combination, substantially parallel rocket tubes, a U-shaped connecting member connecting the tubes, a propellent charge in each of the tubes, means for holding the propellent charges, the said means comprising a holding cage comprising oppositely spaced annular end members, resilient rod-like members connecting the said end members, one of the said annular end members being a split ring adapted to be expanded for insertion of the propellent charge into the holding cage and to close responsively to release the expanding force for retaining the propellent charge in the cage, igniting means for the propellent charges disposed in the U-shaped connecting member, a firing fuse connected to the igniting means and extending through one of the holding cages and the propellent charge therein, the said igniting means extending across the propellent charges for igniting the same simultaneously responsively to firing the igniting means, Venturi nozzles threadedly mounted on the rocket tubes, and closure means normally closing the nozzles for protecting the propellent charges and igniting means against moisture, the said closure means being expelled from the nozzles responsively to ignition of the propellent means.

5. A rocket construction comprising, in combination, a plurality of substantially parallel rocket tubes, U-shaped connecting means connecting the rocket tubes, the said rocket tubes being connected with full diameter through the U-shaped connecting means, means for propelling the rocket, a connecting web joining the said rocket tubes rearwardly thereof, and a cable centrally connected to said web, the cable being connected to the web in horizontal and vertical alignment with the center of gravity of the rocket, whereby the cable stabilizes the rocket during flight while obviating any tendency of the rocket to become deflected from its predetermined course.

6. A rocket construction comprising, in combination, a plurality of substantially parallel rocket tubes, a U-shaped connecting means connecting the rocket tubes at full diameter thereof, a propellent charge in each of the rocket tubes, igniting means for the propellent charges mounted in the U-shaped connecting member and extending substantially across the interior of the said member, the said igniting means comprising a substantially rectangular casing having a long-flame igniting composition therein, an igniting fuse for the igniting means extending through one of the propellent charges, and a Venturi discharge nozzle on each of the rocket tubes, the igniting means extending transversely across the propellent charges for igniting the propellent charges simultaneously.

References Cited in the file of this patent

UNITED STATES PATENTS

| | | |
|---|---|---|
| 932,270 | Goodwin | Aug. 24, 1909 |
| 947,904 | Guerard | Feb. 1, 1910 |
| 2,210,820 | Schermuly et al. | Aug. 6, 1940 |
| 2,406,560 | Pope | Aug. 27, 1946 |
| 2,412,173 | Pope | Dec. 3, 1946 |

FOREIGN PATENTS

| | | |
|---|---|---|
| 367,553 | Great Britain | Feb. 25, 1932 |